US011897159B2

(12) United States Patent
Ueno et al.

(10) Patent No.: US 11,897,159 B2
(45) Date of Patent: Feb. 13, 2024

(54) POST-PROCESSING APPARATUS

(71) Applicant: Seiko Epson Corporation, Tokyo (JP)

(72) Inventors: Kohei Ueno, Matsumoto (JP); Chiaki Shimada, Okaya (JP); Kazuhisa Kawakami, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 182 days.

(21) Appl. No.: 17/650,951

(22) Filed: Feb. 14, 2022

(65) Prior Publication Data

US 2022/0258373 A1 Aug. 18, 2022

(30) Foreign Application Priority Data

Feb. 15, 2021 (JP) ................................ 2021-021546

(51) Int. Cl.
*B26F 1/14* (2006.01)
*B26D 7/18* (2006.01)
*B26F 1/00* (2006.01)

(52) U.S. Cl.
CPC .................. *B26F 1/14* (2013.01); *B26D 7/18* (2013.01); *B26F 1/0092* (2013.01)

(58) Field of Classification Search
CPC ............. B26D 7/14; B26F 1/14; B26F 1/0092
See application file for complete search history.

(56) References Cited

U.S. PATENT DOCUMENTS

| | | | | |
|---|---|---|---|---|
| 7,954,811 B2 * | 6/2011 | Ishikawa | B26D 7/015 | 271/236 |
| 8,406,681 B2 * | 3/2013 | Miyake | B26F 1/02 | 270/58.08 |
| 8,515,333 B2 * | 8/2013 | Motoyoshi | G03G 15/6582 | 399/407 |
| 9,144,915 B2 * | 9/2015 | Watanabe | G03G 15/6544 | |
| 11,590,672 B2 * | 2/2023 | Akaike | G03G 15/6582 | |
| 2005/0000336 A1 * | 1/2005 | Hattori | B26F 1/0092 | 83/72 |
| 2006/0022395 A1 * | 2/2006 | Tanigami | B65H 31/00 | 270/58.08 |
| 2007/0045928 A1 * | 3/2007 | Yoshie | B42C 1/12 | 270/58.08 |

(Continued)

FOREIGN PATENT DOCUMENTS

JP 2002-200592 7/2002

*Primary Examiner* — Sean M Michalski
(74) *Attorney, Agent, or Firm* — WORKMAN NYDEGGER

(57) ABSTRACT

A post-processing apparatus includes a transport path having a first path member and a second path member, a punching member disposed on the transport path to perform punching on the medium. The transport path includes a first transport path disposed downstream of the punching member in a transport direction and a second transport path continuously extending downstream of the first transport path in the transport path, the second transport path having a curved shape to hold the medium in a curved state, the first path member in the second transport path forms an outer side of the curved shape and is disposed at a position further separated from the first surface than the first path member in the first transport path, and an upstream end in the transport direction of the medium in the curved state is moved from the first transport path to the second transport path.

14 Claims, 8 Drawing Sheets

(56) References Cited

U.S. PATENT DOCUMENTS

| | | | | |
|---|---|---|---|---|
| 2008/0219802 | A1* | 9/2008 | Hata | B42C 9/0025 412/19 |
| 2009/0290959 | A1* | 11/2009 | Hata | B26F 1/12 270/58.08 |
| 2010/0037738 | A1* | 2/2010 | Kobayashi | B26D 5/02 83/13 |
| 2010/0072693 | A1* | 3/2010 | Ishikawa | B65H 35/04 271/232 |
| 2010/0158597 | A1* | 6/2010 | Miyake | B26F 1/02 399/407 |
| 2013/0221596 | A1* | 8/2013 | Watanabe | G03G 15/6573 83/418 |
| 2015/0309464 | A1* | 10/2015 | Kubota | B26D 7/1818 83/123 |
| 2018/0194032 | A1* | 7/2018 | Akaike | B26F 1/14 |
| 2023/0150789 | A1* | 5/2023 | Shoji | B26F 1/02 271/227 |

* cited by examiner

FIG. 6

TA

| DENSITY [%] | CURVED PATH OPENING |
|---|---|
| 0-10 | OFF |
| 11-20 | OFF |
| 21-30 | OFF |
| 31-40 | OFF |
| 41-50 | OFF |
| 51-60 | OFF |
| 61-70 | ON |
| 71-80 | ON |
| 81-90 | ON |
| 91-100 | ON |
| 101 OR GREATER | ON |

TB

| DENSITY [%] | CURVED PATH OPENING |
|---|---|
| 0-10 | OFF |
| 11-20 | OFF |
| 21-30 | OFF |
| 31-40 | OFF |
| 41-50 | ON |
| 51-60 | ON |
| 61-70 | ON |
| 71-80 | ON |
| 81-90 | ON |
| 91-100 | ON |
| 101 OR GREATER | ON |

TC

| DENSITY [%] | CURVED PATH OPENING |
|---|---|
| 0-10 | OFF |
| 11-20 | OFF |
| 21-30 | ON |
| 31-40 | ON |
| 41-50 | ON |
| 51-60 | ON |
| 61-70 | ON |
| 71-80 | ON |
| 81-90 | ON |
| 91-100 | ON |
| 101 OR GREATER | ON |

TD

| DENSITY [%] | CURVED PATH OPENING |
|---|---|
| 0-10 | ON |
| 11-20 | OFF |
| 21-30 | OFF |
| 31-40 | OFF |
| 41-50 | OFF |
| 51-60 | OFF |
| 61-70 | OFF |
| 71-80 | OFF |
| 81-90 | ON |
| 91-100 | ON |
| 101 OR GREATER | ON |

TE

| DENSITY [%] | CURVED PATH OPENING |
|---|---|
| 0-10 | OFF |
| 11-20 | OFF |
| 21-30 | OFF |
| 31-40 | OFF |
| 41-50 | OFF |
| 51-60 | OFF |
| 61-70 | ON |
| 71-80 | ON |
| 81-90 | ON |
| 91-100 | ON |
| 101 OR GREATER | ON |

TF

| DENSITY [%] | CURVED PATH OPENING |
|---|---|
| 0-10 | OFF |
| 11-20 | OFF |
| 21-30 | OFF |
| 31-40 | OFF |
| 41-50 | ON |
| 51-60 | ON |
| 61-70 | ON |
| 71-80 | ON |
| 81-90 | ON |
| 91-100 | ON |
| 101 OR GREATER | ON |

TG

| DENSITY [%] | CURVED PATH OPENING |
|---|---|
| 0-10 | ON |
| 11-20 | ON |
| 21-30 | ON |
| 31-40 | OFF |
| 41-50 | OFF |
| 51-60 | OFF |
| 61-70 | OFF |
| 71-80 | OFF |
| 81-90 | OFF |
| 91-100 | OFF |
| 101 OR GREATER | ON |

TH

| DENSITY [%] | CURVED PATH OPENING |
|---|---|
| 0-10 | ON |
| 11-20 | ON |
| 21-30 | OFF |
| 31-40 | OFF |
| 41-50 | OFF |
| 51-60 | OFF |
| 61-70 | OFF |
| 71-80 | OFF |
| 81-90 | ON |
| 91-100 | ON |
| 101 OR GREATER | ON |

TI

| DENSITY [%] | CURVED PATH OPENING |
|---|---|
| 0-10 | ON |
| 11-20 | OFF |
| 21-30 | OFF |
| 31-40 | OFF |
| 41-50 | OFF |
| 51-60 | OFF |
| 61-70 | ON |
| 71-80 | ON |
| 81-90 | ON |
| 91-100 | ON |
| 101 OR GREATER | ON |

POST-PROCESSING APPARATUS

The present application is based on, and claims priority from JP Application Serial Number 2021-021546, filed Feb. 15, 2021, the disclosure of which is hereby incorporated by reference herein in its entirety.

BACKGROUND

1. Technical Field

The present disclosure relates to a post-processing apparatus that punches holes in a medium.

2. Related Art

A punch pin is moved forward and backward through a medium in a sheet shape to punch holes in the sheet, that is, to perform punching. In this operation, punched scraps, which correspond to the punched holes of the medium, are ideally separated from the medium and collected. However, some punched scraps may remain in the medium without being completely separated from the medium or may remain attached to the medium due to, for example, static electricity. When such punched scraps are transported downstream together with the medium along the transport path, the punched scraps may enter the internal components of the apparatus and cause malfunctions.

A punching processing apparatus that includes a mechanism for punching holes in individual paper sheets by moving a punch pin forward and backward with respect to a punch die is disclosed in JP-A-2002-200592, in which the mechanism includes a brush member disposed near a hole in the bottom of the punch die to scrape punched scraps from the punch pin.

Such mechanism for removing punched scraps by using the brush, however, needs to replace a worn brush by the user and is thus inconvenient. Accordingly, such structures for actively removing punched scraps from a medium have room for further improvement in terms of user convenience.

SUMMARY

According to an aspect of the present disclosure, a post-processing apparatus includes a transport path having a first path member that forms a path facing a first surface of a medium and a second path member that forms a path facing a second surface of the medium, the medium, on which recording was performed by a recording section, being transported on the transport path, and a punching member disposed on the transport path to perform punching on the medium. The transport path includes a first transport path disposed downstream of the punching member in a transport direction and a second transport path continuously extending downstream of the first transport path in the transport path, the second transport path having a curved shape to hold the medium in a curved state, the first path member in the second transport path forms an outer side of the curved shape and is disposed at a position further separated from the first surface than the first path member in the first transport path, and an upstream end in the transport direction of the medium in the curved state is moved from the first transport path to the second transport path.

BRIEF DESCRIPTION OF THE DRAWINGS

FIG. 6 illustrates environment-density tables of different environments.

DESCRIPTION OF EXEMPLARY EMBODIMENTS

Hereinafter, embodiments of the present disclosure will be described with reference to the attached drawings. Note that each of the drawings is merely illustrative for describing the embodiments. Since the drawings are illustrations, the ratios and the shapes may be imprecise, and the drawings may be mismatched each other, sometimes may contain partial omissions.

1. First Embodiment

Figure 1:
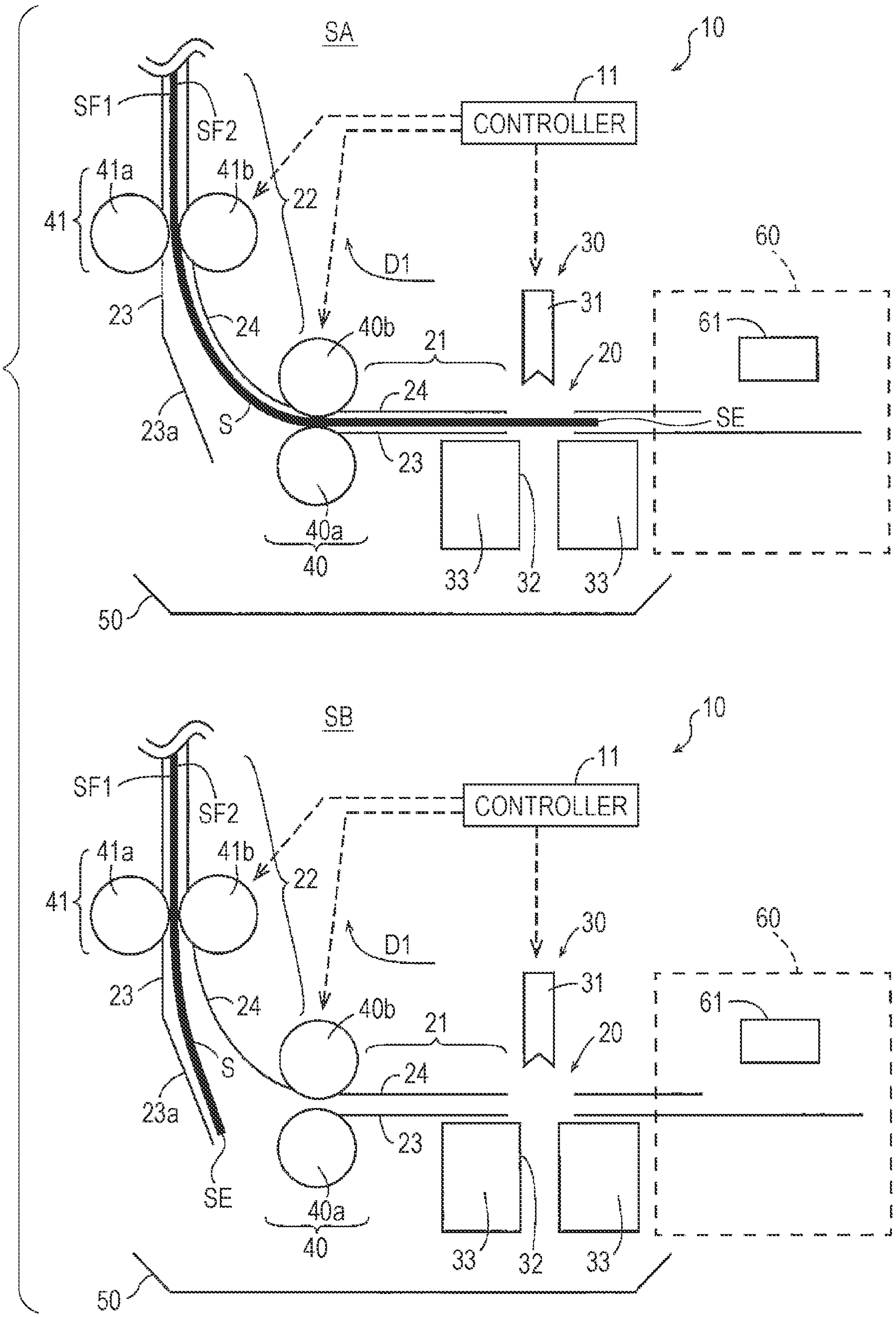
FIG. 1 is a schematic view illustrating a post-processing apparatus according to a first embodiment.

FIG. 1 is a schematic view illustrating a structure of a post-processing apparatus 10 according to the first embodiment viewed from a side orthogonal to a transport direction D1 of a medium S. FIG. 1 illustrates the post-processing apparatus 10 in a state SA in which the post-processing apparatus 10 is about to perform a punching operation on the medium S and in a state SB in which the medium S is transported for some distance after the punching operation. The post-processing apparatus 10 may be referred to as a punching apparatus or a hole punch.

The post-processing apparatus 10 includes a transport path 20, a punching member 30, and transport roller pairs 40 and 41. The transport path 20 is a path on which a medium S is transported, and the transport direction D1 is a direction along the transport path 20. The expression "upstream in the transport direction D1" may be simply denoted as "upstream" and the expression "downstream in the transport direction D1" as "downstream". The medium S is a sheet medium. The medium S is typically a paper sheet but may be any medium that can be punched, and the medium S may be a medium made of a material other than paper.

The punching member 30 is disposed on the transport path 20 and is used to punch a hole in the medium S transported from the upstream path. The punching member 30 includes a punch pin 31 and a punch table 33 that has a punch pin hole 32 for accommodating the punch pin 31. The punch pin 31 and the punch table 33 face each other in the up-down direction across the transport path 20. The punch pin 31 above moves back and forth toward the punch pin hole 32 below to create a punch hole in the medium S located between the punch pin 31 and the punch pin hole 32 as illustrated in the state SA.

One of the two surfaces of the medium S is referred to as a first surface SF1 and the other surface is referred to as a second surface SF2. In FIG. 1, the first surface SF1 faces the punch table 33 and the second surface SF2 faces the punch pin 31. With this structure, the punching member 30 punches a hole in a direction from the second surface SF2 to the first surface SF1 of the medium S. A downstream end of the medium S is referred to as a leading edge and an upstream end of the medium S is referred to as a trailing edge. FIG. 1 illustrates a trailing edge SE of the medium S.

A collection section 50 is provided below the punch table 33. The collection section 50 is, for example, a basket or a tray. Punched scraps of the medium S created by punching using the punch pin 31 fall through the punch pin hole 32 and are collected by the collection section 50.

A portion of the transport path 20 downstream of the punching member 30 is referred to as a "first transport path 21". The first transport path 21 is a path substantially from the punching member 30 to the first transport roller pair 40 disposed downstream of the punching member 30. A portion of the transport path 20 that continuously extends downstream of the first transport path 21 is referred to as a "second transport path 22". The second transport path 22 is a path substantially downstream of the first transport roller pair 40. The first transport roller pair 40 may be considered to be included in any of the first transport path 21 and the second transport path 22. The second transport roller pair 41 is disposed on the second transport path 22. Here, the first transport path 21 and the second transport path 22 are described with reference to the first transport roller pair 40; however, the first transport path 21 and the second transport path 22 may be described in relation to a reference other than the first transport roller pair 40.

The first transport roller pair 40 is a pair of a roller 40*a* and a roller 40*b* that face each other across the transport path 20. One of the roller 40*a* and the roller 40*b* is a driving roller that receives power from a motor and rotates, and the other is a driven roller. The first transport roller pair 40 rotates while nipping the medium S with the roller 40*a* and the roller 40*b* to transport the medium S along the transport path 20. Similarly, the second transport roller pair 41 is a pair of a roller 41*a* and a roller 41*b* that face each other across the transport path 20. One of the roller 41*a* and the roller 41*b* is a driving roller that receives power from a motor and rotates, and the other is a driven roller. The second transport roller pair 41 rotates while nipping the medium S with the roller 41*a* and the roller 41*b* to transport the medium S along the transport path 20.

The first transport roller pair 40 and the second transport roller pair 41 are collectively referred to as a transport section, which transports the medium S. The transport section may further include transport components, such as rollers for transporting the medium S, at a position upstream of the first transport roller pair 40 and at a position downstream of the second transport roller pair 41.

Among the components of the transport path 20, a component that forms a path that faces the first surface SF1 of the medium S is referred to as a "first path member 23", and a component that forms a path that faces the second surface SF2 of the medium S is referred to as a "second path member 24". More specifically, the first transport path 21 includes the first path member 23 and the second path member 24, and similarly, the second transport path 22 includes the first path member 23 and the second path member 24.

The second transport path 22 has a curved shape. FIG. 1 illustrates the transport path 20 that is horizontal or substantially horizontal in a portion upstream of the first transport roller pair 40 and has a portion curved upward from around the first transport roller pair 40 to around the second transport roller pair 41 in the second transport path 22. As illustrated in FIG. 1, the first path member 23 in the second transport path 22 forms the outer side of the curved shape and the second path member 24 of the second transport path 22 forms the inner side of the curved shape.

Hereinafter, for the sake of convenience, the first path member 23 in the second transport path 22 is referred to as a "curved outer member 23*a*". In the state SA, the curved outer member 23*a* is disposed at a position further separated from the first surface SF1 of the medium S than the first path member 23 in the first transport path 21. In other words, the curved outer member 23*a* enables the transport path 20 to be open downward at the position at which the transport path 20 is curved. The second transport path 22 having such a curved shape can hold the medium S in a curved orientation. Accordingly, a portion of the medium S is curved while being transported between the first transport roller pair 40 and the second transport roller pair 41.

A controller 11 includes a processor and memory and causes the punch pin 31 to be moved forward or backward and causes the transport section to be driven. In FIG. 1, a recording section 60 that performs recording on the medium S is disposed upstream of the punching member 30. The recording section 60 performs recording on the medium S by using, for example, a liquid discharge head 61 that discharges a liquid, such as ink. Accordingly, the transport path 20 is a path for transporting the medium S on which recording has been performed by the recording section 60 to the punching member 30 and transporting the medium S further downstream of the punching member 30.

In the example in FIG. 1, the recording section 60 and the post-processing apparatus 10 disposed downstream of the recording section 60 are coupled by the transport path 20. In such a structure, the post-processing apparatus 10 can be regarded as part of an apparatus having the recording section 60, such as a printer or a multifunction peripheral. The post-processing apparatus 10, however, may be physically separate from the recording section 60. For example, the user may transfer a medium S on which recording has been performed by the recording section 60 to the post-processing apparatus 10 and set the medium S at a position upstream of the transport path 20 of the post-processing apparatus 10, and thereby, a punching operation can be performed on the medium S by using the post-processing apparatus 10, which is independent from the recording section 60. In addition, it should be noted that in a structure in which the post-processing apparatus 10 is part of the apparatus having the recording section 60, the controller 11 may also function as a controller that controls recording on a medium S by using the recording section 60.

Figure 2:
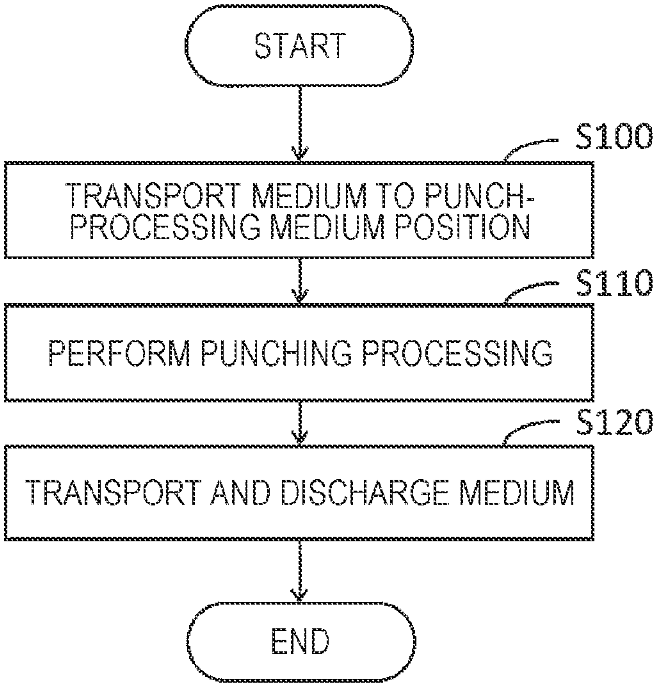
FIG. 2 is a flowchart illustrating punching processing.

FIG. 2 is a flowchart illustrating the punching processing to be performed by the controller 11 in accordance with a program stored in the memory. In step S100, the controller 11 causes the transport section to transport the medium S to a punch-processing medium position. The punch-processing medium position is a position at which the medium S is to be stopped while a punching operation is performed by the punching member 30. The post-processing apparatus 10 includes a sensor (not illustrated) that can detect a leading edge or a trailing edge SE of a medium S on the transport path 20. The sensor may be an optical sensor, a mechanical sensor, or another type of sensor. The controller 11 acquires in advance the information on the position of the sensor on the transport path 20. For example, the sensor is disposed at a predetermined position upstream of the punching member 30. The punch-processing medium position is also a predetermined position. For example, the medium S that is in the state SA is located at the punch-processing medium position. After the transport section starts transporting the medium S, for example, when the sensor detects the trailing edge SE of the medium S, the controller 11 further transports the medium S by an amount corresponding to a distance from the sensor to the position of the trailing edge SE when the medium S is located at the punch-processing medium position. This processing completes the operation of transporting the medium S to the punch-processing medium position.

After the transport processing in step S100, while the medium S is stopped, the controller 11 performs punching processing on the medium S in step S110. More specifically, the punch pin 31 is moved downward to the medium S to punch a hole in the medium S. After a hole is punched in the medium S, the controller 11 causes the punch pin 31 to be moved upward to separate the punch pin 31 from the medium S. In the state SA, the trailing edge SE of the medium S is located slightly upstream of the punch pin 31. Accordingly, by performing punching on the medium S that is in the state SA by using the punch pin 31, a punch hole is created in an end portion including the trailing edge SE of the medium S.

The end portion including the trailing edge SE is an area of the medium S around the trailing edge SE. The area around the trailing edge SE can be defined in various ways, for example, the medium S may be divided into a plurality of areas in the transport direction D1 and the area furthest upstream may be defined as the area around the trailing edge SE.

After step S110, in step S120, the controller 11 again causes the transport section to transport the punched medium S downstream and discharge the punched medium S. By the processing, the punching processing on the sheet of the medium S is completed. During the transport processing in step S120, the medium S is moved from the state in which the medium S is nipped and curved by the first transport roller pair 40 and the second transport roller pair 41. The trailing edge SE then passes the first transport roller pair 40 and is moved from the first transport path 21 to the second transport path 22. When the trailing edge SE exits the first transport roller pair 40, the trailing edge SE is elastically moved toward the curved outer member 23*a* in response to the elasticity of the curved medium S as illustrated in the state SB. Subsequently, the trailing edge SE and the first surface SF1 around the trailing edge SE come into contact with the curved outer member 23*a*.

Such an elastic movement of the trailing edge SE after exiting the first transport roller pair 40 and the contact of the trailing edge SE with the curved outer member 23*a* cause punched scraps adhering to the medium S to separate from the medium S, and the separated punched scraps fall. The collection section 50 is large enough to collect the punched scraps not only below the punching member 30 but also below the second transport path 22. With this structure, the collection section 50 can collect the punched scraps that have fallen from the position of the second transport path 22, at which the second transport path 22 is open downward by the curved outer member 23*a*. It should be noted that the medium S in the state SB has the punched hole, but illustration of the punched hole is omitted.

According to the first embodiment, the post-processing apparatus 10 includes the transport path 20 having the first path member 23, which forms the path facing the first surface SF1 of the medium S, and the second path member 24, which forms the path facing the second surface SF2 of the medium S, to transport the medium S on which recording has been performed by the recording section 60 and includes the punching member 30, which is disposed on the transport path 20 to perform punching on the medium S. The transport path 20 includes the first transport path 21 disposed downstream of the punching member 30 in the transport direction and the second transport path 22 continuously extending downstream of the first transport path 21. The second transport path 22 has the curved shape to hold the medium S in a curved state. The first path member 23 in the second transport path 22 forms the outer side of the curved shape and is disposed at the position further separated from the first surface SF 1 than the first path member 23 in the first transport path 21. The upstream end in the transport direction of the medium S in the curve state is moved from the first transport path 21 to the second transport path 22. With this structure, without using a brush such as that in the related art, punched scraps adhering to the medium S can be actively removed from the medium S by the movement of the medium S when the trailing edge SE is moved from the first transport path 21 to the second transport path 22 and by the effect of the curved outer member 23*a*. Accordingly, time and effort required to replace worn brushes or the like can be eliminated.

According to the first embodiment, the punching member 30 performs punching on the upstream end portion of the medium S in the transport direction. In this structure, punched scraps tend to adhere to the portion of the medium S around the trailing edge SE; however, the portion around the trailing edge SE comes into contact with the curved outer member 23*a* due to the movement of the medium S when the trailing edge SE is moved from the first transport path 21 to the second transport path 22, and thereby, punched scraps adhering to the medium S can be appropriately removed.

According to the first embodiment, the punching member 30 performs punching in the direction from the second surface SF2 to the first surface SF1 of the medium S. In this structure, punched scraps tend to adhere to the first surface SF1 of the medium S; however, the first surface SF1 comes into contact with the curved outer member 23*a* due to the movement of the medium S when the trailing edge SE is moved from the first transport path 21 to the second transport path 22, and thereby, punched scraps adhering to the medium S can be removed appropriately.

According to the first embodiment, the post-processing apparatus 10 includes the collection section 50 capable of collecting punched scraps from the medium S created by punching. The collection section 50 collects punched scraps below the punching member 30 and below the second transport path 22. With this structure, punched scraps created by the punching member 30 and punched scraps removed from the medium S in the second transport path 22, which is disposed downstream of the punching member 30, can be collected by the same collection section 50.

According to the first embodiment, the second transport path 22 curves upward with respect to the horizontal plane. With this structure, punched scraps can be appropriately removed from the medium S by using the upwardly curved second transport path 22.

2. Second Embodiment

Next, a second embodiment is described. In the following description including the second embodiment, descriptions similar to those in the first embodiment are omitted.

Figure 3:
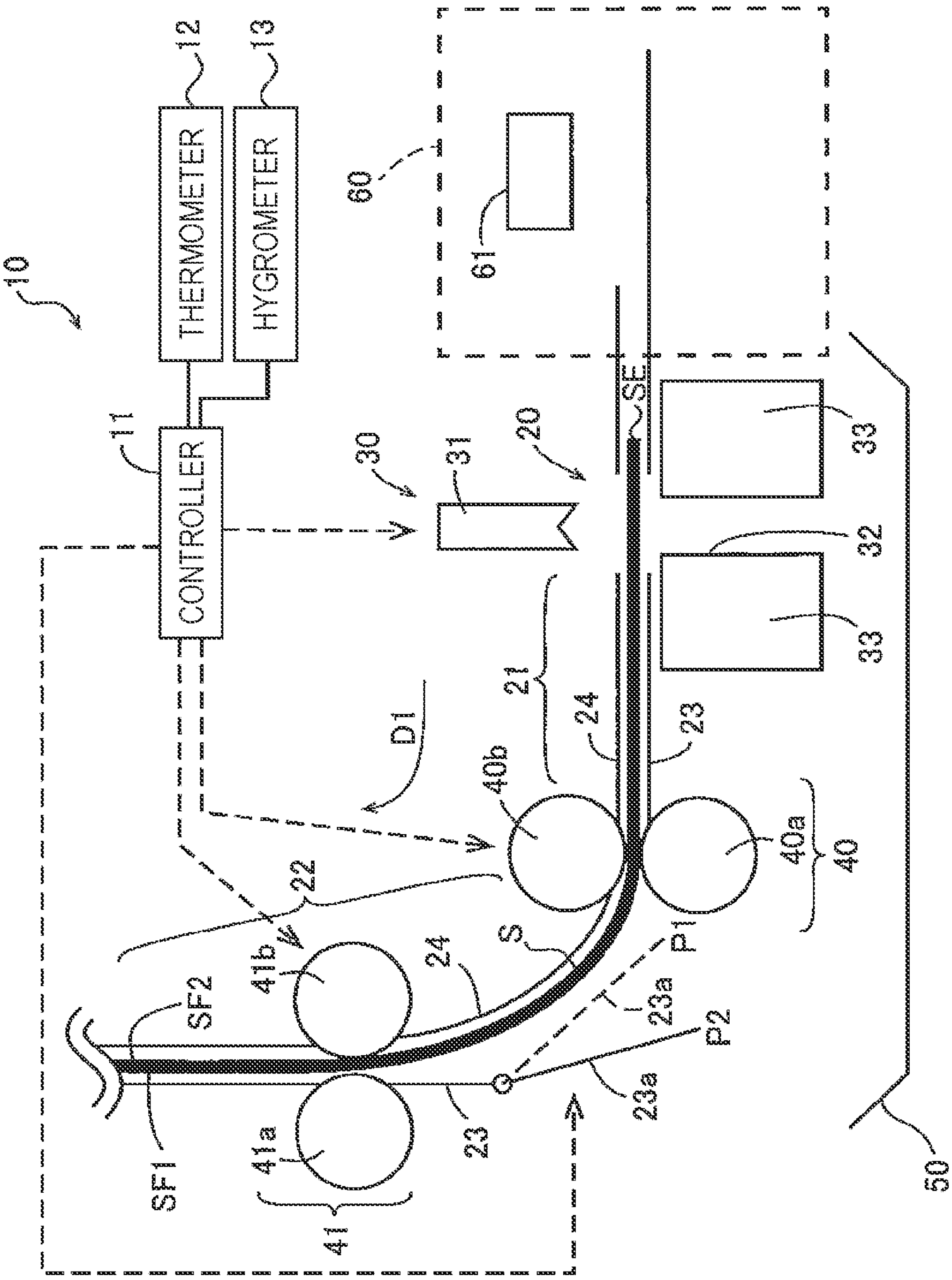
FIG. 3 is a schematic view illustrating a post-processing apparatus according to a second embodiment.

FIG. 3 is a schematic view illustrating a structure of the post-processing apparatus 10 according to the second embodiment viewed from the same side as in FIG. 1. The controller 11 according to the second embodiment is capable of controlling the movement of the curved outer member 23*a* by using a predetermined power such as a motor (not illustrated). The controller 11 is capable of causing the curved outer member 23*a* to be moved between a first position P1 and a second position P2 that is a position further separated from the first surface SF1 of the medium S than the first position P1. The second position P2 may be regarded as the same position as the position of the curved outer member 23*a* according to the first embodiment. The curved outer member 23*a* according to the first embodiment is fixed at the second position P2.

When the curved outer member 23*a* is located at the first position P1, the second transport path 22 is substantially closed toward the outside of the path. The second transport path 22 closed toward the outside of the path decreases the effect of removal of punched scraps from the medium S in the second transport path 22, but escaping sound issued due to the contact of the medium S with the curved outer member 23*a* can be suppressed, which increases the quietness. Accordingly, the controller 11 according to the second embodiment causes the curved outer member 23*a* to be moved to the first position P1 or to the second position P2 using recording information on recording performed on the medium S by the recording section 60 or using environment information on an environment in which the post-processing apparatus 10 is installed. The expression "using recording information or environment information" means "using at least one of recording information and environment information". More specifically, in a state in which punched scraps easily adhere to the medium S, the controller 11 causes the curved outer member 23*a* to be moved to the second position P2, whereas in a state in which punched scraps do not easily adhere to the medium S, the controller 11 causes the curved outer member 23*a* to be moved to the first position P1.

Figure 4:
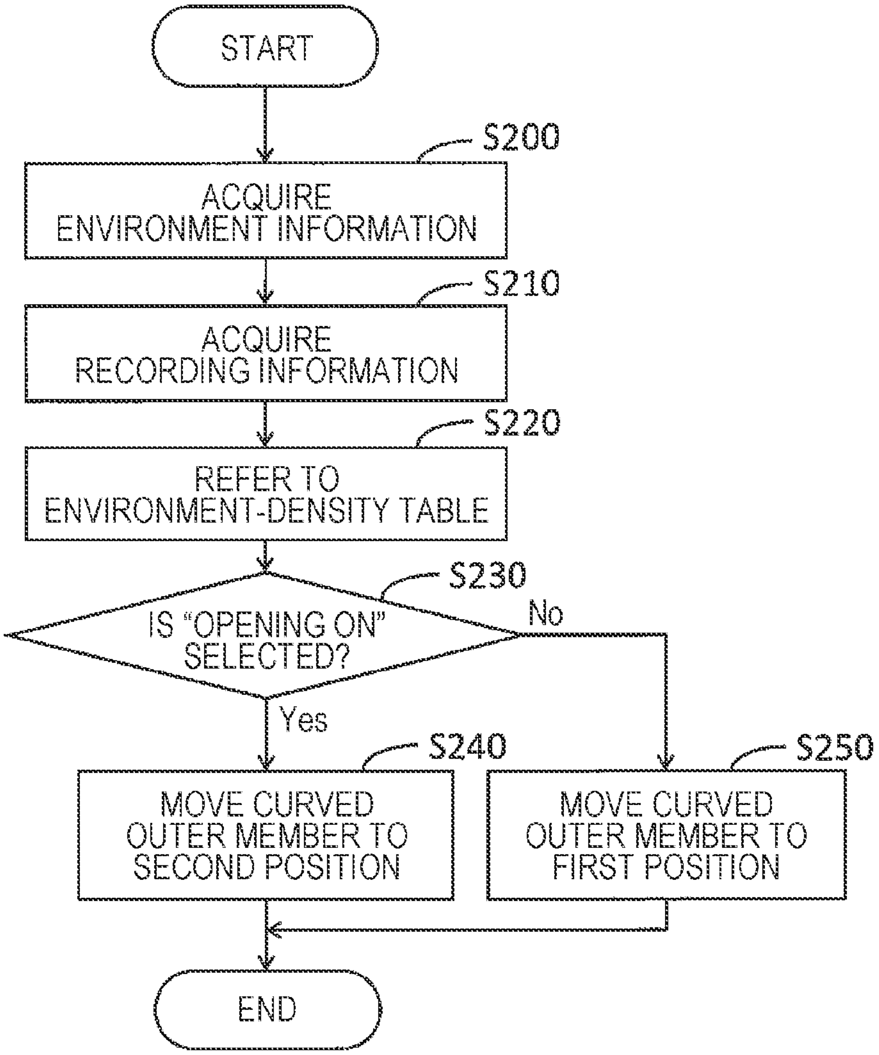
FIG. 4 is a flowchart illustrating movement control processing to be performed on a curved outer member.

FIG. 4 is a flowchart illustrating the movement control processing for the curved outer member 23*a* to be performed by the controller 11 in accordance with a program stored in the memory. The controller 11 performs the movement control processing in FIG. 4 when performing the punching processing in FIG. 2 on a sheet of the medium S. The controller 11 may complete the movement control processing in FIG. 4 for the medium S by the time the processing in step S110 in the flowchart in FIG. 2 for the medium S is complete at the latest.

In step S200, the controller 11 acquires environment information. The environment information includes humidity and temperature in the environment in which the post-processing apparatus 10 is installed. In FIG. 3, the controller 11 is coupled to a thermometer 12 and a hygrometer 13. The controller 11 may acquire temperature from the thermometer 12 and humidity from the hygrometer 13. The controller 11 may acquire humidity and temperature through a user input to the post-processing apparatus 10 without the thermometer 12 and the hygrometer 13.

In step S210, the controller 11 acquires recording information on the target medium S. The recording information includes the content of a recording process to be performed on the target medium S by the recording section 60 or the content of a recording process that has been performed. The recording information includes recording data by the unit of pages. When the recording section 60 performs recording by using the liquid discharge head 61, the recording information is data that defines whether respective pixels in the page discharge or not discharge liquid dots. By using such recording information, the recording density of the medium S is determined. When the controller 11 also functions as a controller for the recording section 60, it can be considered that the controller 11 has already acquired the recording information on the target medium S. When the controller 11 does not function as a controller for the recording section 60, the controller 11 acquires the recording information on the target medium S through communication with the recording section 60 or a user input. The order of performing step S200 and step S210 in FIG. 4 may be reversed or these steps may be performed simultaneously.

Figure 5:
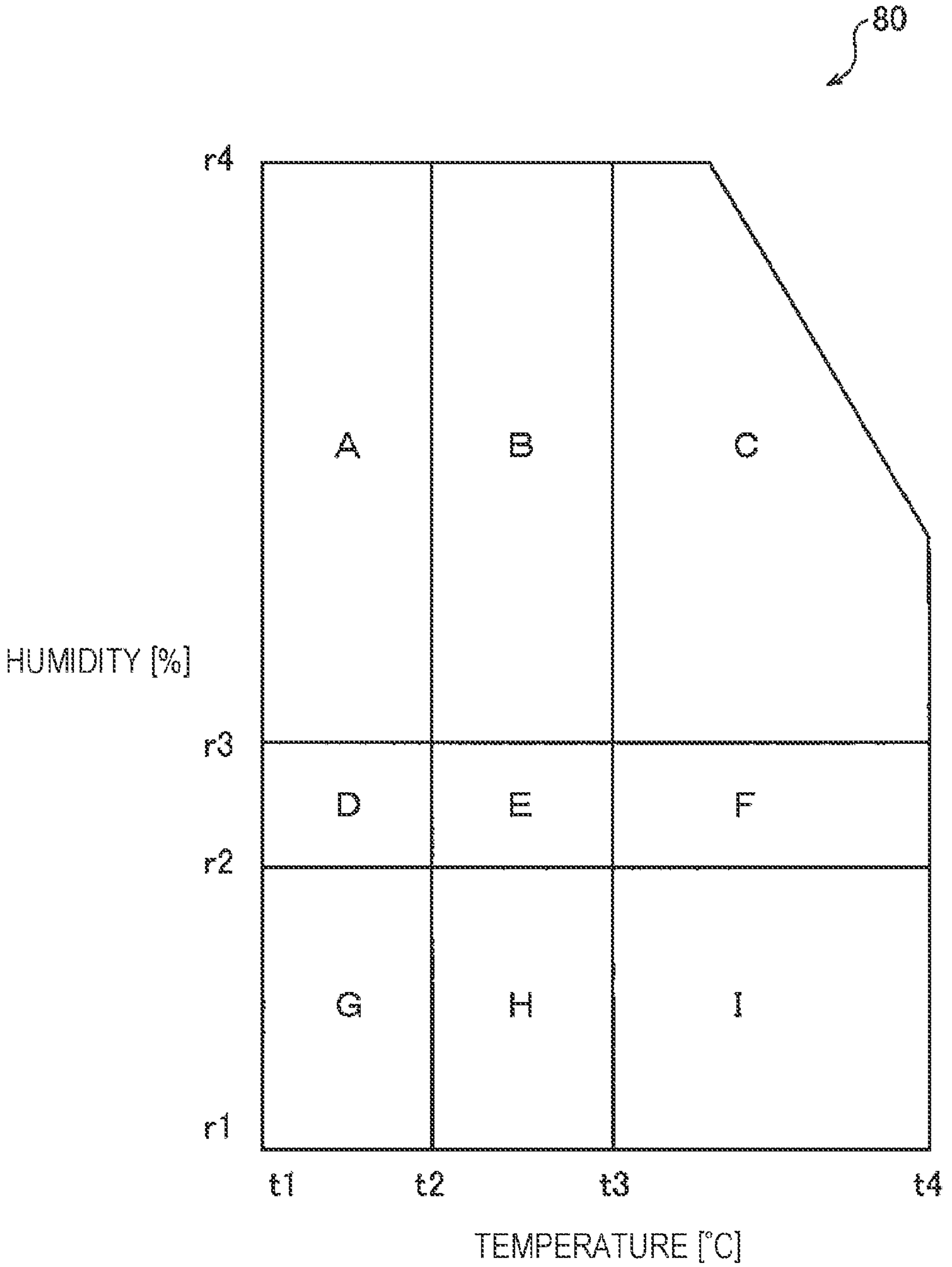
FIG. 5 illustrates an environment table to be used for selecting an environment-density table.

In step S220, the controller 11 refers to an environment-density table using the environment information and the record information acquired in steps S200 and S210. FIG. 5 illustrates an environment table 80 to be used to select an environment-density table to be referred to corresponding to the temperature and the humidity. The environment-density tables and the environment table 80 are stored in advance in memory that can be accessed by the controller 11.

In the environment table 80, the horizontal axis indicates temperature and the vertical axis indicates humidity. The controller 11 selects, from environments A to I, an environment in which the post-processing apparatus 10 is installed by using the environment table 80 in accordance with the combination of the temperature and the humidity acquired in step S200. In the environment table 80, the temperature range is divided by temperature thresholds t1, t2, t3, and t4. In addition, in the environment table 80, the humidity range is divided by humidity thresholds r1, r2, r3, and r4. For example, when the temperature is the temperature threshold t1 or greater and less than the temperature threshold t2 and the humidity is the humidity threshold r1 or greater and less than the humidity threshold r2, the controller 11 determines that the environment is environment G. In another case, for example, when the temperature is the temperature threshold t2 or greater and less than the temperature threshold t3 and the humidity is the humidity threshold r2 or greater and less than the humidity threshold r3, the controller 11 determines that the environment is environment E.

FIG. 6 illustrates environment-density tables of different environments. Environment-density tables TA, TB, TC, TD, TE, TF, TG, TH, and TI each define the relationship between recording densities and ON or OFF of the opening of the curved path. The condition "OPENING ON" for the curved path denotes opening of the curved outer member 23*a*, that is, selecting the second position P2, whereas the condition "OPENING OFF" for the curved path denotes closing the curved outer member 23*a*, that is, selecting the first position P1.

Respective references A to I next to reference T in the environment-density tables correspond to environments A to I to be selected from the environment table 80. When the controller 11 determines, for example, that the environment is environment A in the environment table 80 in accordance with the temperature and the humidity, the controller 11 refers to the environment-density table TA. When the controller 11 determines, for example, that the environment is environment E in the environment table 80 in accordance with the temperature and the humidity, the controller 11 refers to the environment-density table TE.

The controller 11 calculates a recording density of the medium S by using the recording information acquired in step S210. The controller 11 calculates, as the recording density, a ratio of the number of pixels, for which discharge as dots is defined, to the total number of pixels in the page described in the recording information. In other words, the ratio of the number of ink dots to be discharged onto the medium S to the number of dischargeable ink dots in the page is defined as the recording density. It should be noted that the controller 11 may calculate a recording density at the position to be punched by the punching member 30 in the medium S, instead of the recording density of the entire medium S. As described above, the punching member 30 performs punching on the area around the trailing edge SE of the medium S. The area around the trailing edge SE corresponds to the position to be punched. The position and size of the area around the trailing edge SE in the medium S may be defined in advance. This configuration enables the controller 11 to focus on only pixels that correspond to the area around the trailing edge SE among the all pixels in the page described in the recording information, and to calculate, as the recording density corresponding to the position to be punched, the ratio of the number of pixels, for which discharge as dots is defined, to the pixels in this area.

Using the calculated recording density and the reference environment-density table, the controller 11 selects "OPENING ON" or "OPENING OFF". In step S230, when the controller 11 refers to the environment-density table using the environment information and the record information as described above and selects "OPENING ON", in accordance with the determination "Yes", the processing proceeds to step S240. In contrast, when "OPENING OFF" is selected, in accordance with the determination "No" in step S230, the processing proceeds to step S250. The controller 11, for example, refers to the environment-density table TA that corresponds to the environment information, and when the recording density calculated using the recording information is 65%, the controller 11 selects "OPENING ON" in accordance with the environment-density table TA.

The environment-density tables TA, TB, TC, TD, TE, TF, TG, TH, and TI are described. A medium S that has a high recording density, that is, a medium S with a large amount of liquid discharged on it, may swell, and in such a case, punched scraps tend to remain due to poor punching. Accordingly, in the environment-density tables, typically, high recording densities are associated with "OPENING ON" and low recording densities are associated with "OPENING OFF". In the environment-density tables, recording densities at which "OPENING OFF" is switched to "OPENING ON" are values at which "No" and "Yes" are switched in step S230, that is, density thresholds of recording densities. For example, in the environment-density table TA, the recording density 60% is the density threshold. In the environment-density table TB, the recording density 40% is the density threshold. In the environment-density table TD, the recording density 80% is the density threshold.

As in the tables, different environment-density tables have different density thresholds corresponding to different humidity and temperature. At high humidity, punched scraps tend to remain in a medium S. Accordingly, when environment-density tables having the same temperature conditions are compared with each other, for example, when the environment-density tables TA, TD, and TG are compared with each other, lower density thresholds are set in the environment-density tables having higher humidity, and "OPENING ON" is more likely to be selected. In addition, punched scraps tend to remain in a medium S when temperatures are high. Accordingly, when environment-density tables having the same humidity conditions are compared with each other, for example, when the environment-density tables TA, TB, and TC are compared with each other, lower density thresholds are set in environment-density tables having higher temperatures, and "OPENING ON" is more likely to be selected.

In addition, under conditions having low recording densities and low humidity, a phenomenon in which punched scraps tend to adhere to a medium S due to static electricity is observed. Accordingly, for example, in environment-density tables for low humidity conditions, such as the environment-density tables TG, TH, and TI, "OPENING ON" is also associated with recording densities lower than predetermined recording densities that are lower than the above-described density thresholds.

In step S240, the controller 11 causes the curved outer member 23*a* to be moved to the second position P2 and ends the flowchart in FIG. 4. When the curved outer member 23*a* has already been located at the second position P2 at the time the controller 11 determines to be "Yes" in step S230, the processing in step S240 has been substantially completed, and the controller 11 ends the flowchart in FIG. 4 without changing the position of the curved outer member 23*a*.

In contrast, in step S250, the controller 11 causes the curved outer member 23*a* to be moved to the first position P1 and ends the flowchart in FIG. 4. When the curved outer member 23*a* has already been located at the first position P1 at the time the controller 11 determines to be "No" in step S230, the processing in step S250 has been substantially completed, and the controller 11 ends the flowchart in FIG. 4 without changing the position of the curved outer member 23*a*.

The controller 11 may control the movement of the curved outer member 23*a* by the following methods. For example, the controller 11 compares a recording density that corresponds to the position to be punched in the medium S and a predetermined density threshold of the recording density. The predetermined density threshold may be a fixed value irrespective of temperature or humidity. When the recording density is greater than or equal to the density threshold, the controller 11 causes the curved outer member 23*a* to be moved to the second position P2, whereas when the recording density is less than the density threshold, the controller 11 causes the curved outer member 23*a* to be moved to the first position P1.

In another case, for example, the controller 11 compares humidity, which represents the environment information, with a predetermined first humidity threshold of humidity. The first humidity threshold may be a fixed value irrespective of temperature or recording density. When the humidity is greater than or equal to the first humidity threshold, the controller 11 causes the curved outer member 23*a* to be moved to the second position P2, whereas when the humidity is less than the first humidity threshold, the controller 11 causes the curved outer member 23*a* to be moved to the first position P1.

In another case, for example, the controller 11 compares humidity, which represents the environment information, with a predetermined second humidity threshold of humidity and compares temperature, which represents the environment information, with a predetermined temperature threshold of temperature. In this case, it is defined that the first humidity threshold is higher than the second humidity threshold. Combinations of the second humidity threshold and the predetermined temperature threshold may be fixed values irrespective of recording density. When humidity is less than the second humidity threshold and temperature is less than the temperature threshold, the controller 11 causes the curved outer member 23*a* to be moved to the second position P2. In contrast, when such a condition with a low humidity and a low temperature does not hold, the controller 11 causes the curved outer member 23*a* to be moved to the first position P1. When the controller 11 determines to move the curved outer member 23*a* to the second position P2 by any of the above-described methods, the controller 11 may cause the curved outer member 23*a* to be moved to the second position P2.

According to the second embodiment, the post-processing apparatus 10 includes the controller 11 configured to control the movement of the first path member 23 in the second transport path 22. The controller 11 is capable of causing the first path member 23 in the second transport path 22 to be moved to the first position P1 or the second position P2 further separated from the first surface SF1 than the first position P1, and the controller 11 causes the first path member 23 in the second transport path 22 to be moved to the first position P1 or the second position P2 by using information on recording performed by the recording section 60 on a medium S or using information on an environment in which the post-processing apparatus 10 is installed. With this structure, the controller 11 can determine that a medium S is under a condition in which punched scraps easily adhere to the medium S using recording information and environment information, and cause the curved outer member 23*a* to be moved to the second position P2 or to the first position P1. In addition, the controller 11 may cause the curved outer member 23*a* to be moved to the first position P1 to achieve high quietness.

According to the second embodiment, when the recording section 60 is configured to perform recording by discharging liquid and the controller 11 controls the movement of the first path member 23 in the second transport path 22 using recording information, the controller 11 compares a recording density, which is the recording information, corresponding to a position to be punched in the medium S by the punching member 30 and a density threshold of the recording density, and when the recording density corresponding to the position to be punched is greater than or equal to the density threshold, the controller 11 causes the first path member 23 in the second transport path 22 to be moved to the second position P2. With this structure, when the medium S is under a condition in which punched scraps easily adhere to the medium S due to a high recording density at the position to be punched, the curved outer member 23*a* may be moved to the second position P2 to actively remove punched scraps from the medium S.

According to the second embodiment, the controller 11 may change the density threshold depending on any of humidity and temperature, which represent environment information. With this structure, the controller 11 may change a density threshold to be compared with a recording density to more accurately determine a condition in which punched scraps easily adhere to the medium S to select the position of the curved outer member 23*a*.

According to the second embodiment, when the controller 11 controls the movement of the first path member 23 in the second transport path 22 using environment information, the controller 11 compares humidity, which represents the environment information, with the first humidity threshold of humidity and when the humidity in the environment information is greater than or equal to the first humidity threshold, the controller 11 causes the first path member 23 in the second transport path 22 to be moved to the second position P2. With this structure, when the medium S is under a condition in which punched scraps easily adhere to the medium S due to high humidity, the curved outer member 23*a* can be moved to the second position P2 to actively remove punched scraps from the medium S.

According to the second embodiment, when the controller 11 controls the movement of the first path member 23 in the second transport path 22 using environment information, the controller 11 compares humidity and temperature, which represent the environment information, with the second humidity threshold of humidity and the temperature threshold of temperature, and when the humidity in the environment information is less than the second humidity threshold and the temperature in the environment information is less than the temperature threshold, the controller 11 causes the first path member 23 in the second transport path 22 to be moved to the second position P2. With this structure, when the medium S is under a condition in which punched scraps easily adhere to the medium S due to low humidity and low temperature, the curved outer member 23*a* can be moved to the second position P2 to actively remove punched scraps from the medium S.

The above-described second embodiment automatically selects and changes the position of the curved outer member 23*a* using the recording information and the environment information at each time of performing the punching processing on the medium S. Such a second embodiment is referred to as an "automatic selection mode" for positioning the curved outer member. In addition, an "opening OFF mode" for fixing the position of the curved outer member 23*a* to the first position P1 irrespective of recording information or environment information or an "opening ON mode" for fixing the position of the curved outer member 23*a* to the second position P2 irrespective of recording information or environment information may be provided.

The user may select any of the "automatic selection mode", "opening OFF mode", and "opening ON mode". More specifically, when the type of a medium S is a predetermined first type in which punched scraps do not easily adhere, the user may issue an instruction for selecting the opening OFF mode to the controller 11. When the type of a medium S is a predetermined second type in which punched scraps easily adhere, the user may issue an instruction for selecting the automatic selection mode to the controller 11. When the type of a medium S is a predetermined third type in which punched scraps more easily adhere as compared to the second type, the user may issue an instruction for selecting the opening ON mode to the controller 11. In accordance with the instruction from the user, the controller 11 selects the corresponding mode and operates the post-processing apparatus 10 in the selected mode.

The controller 11 may acquire the type of a medium S that has been set on the transport path 20 for the punching processing from an input from a predetermined sensor or a user, and depending on the acquired type of the medium S that corresponds to any of the first type, second type, and third type, the controller 11 may select a corresponding one of the "opening OFF mode", "automatic selection mode", and "opening ON mode".

3. Third Embodiment

Figure 7:
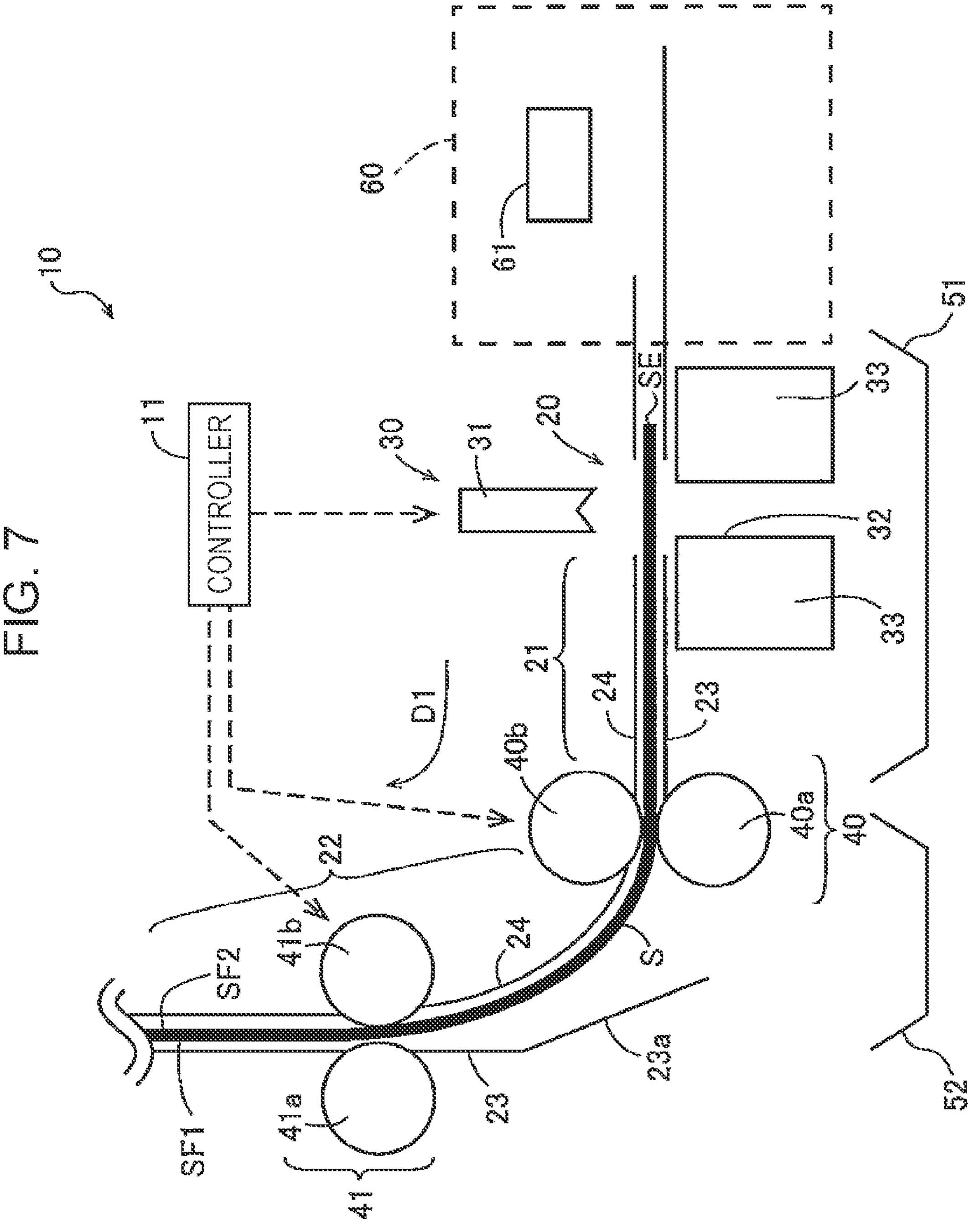
FIG. 7 is a schematic view illustrating a post-processing apparatus according to a third embodiment.

FIG. 7 is a schematic view illustrating a structure of the post-processing apparatus 10 according to a third embodiment viewed from the same side as that in FIG. 1 and FIG. 3. FIG. 7 differs from FIG. 1 in that the post-processing apparatus 10 includes a first collection section 51 and a second collection section 52 instead of the collection section 50. More specifically, the post-processing apparatus 10 according to the third embodiment includes a collection section capable of collecting punched scraps of a medium S created by punching. The collection section includes the first collection section 51 that is disposed below the punching member 30 and the second collection section 52 that is disposed below the second transport path 22. The capacity of the second collection section 52 is lower than the capacity of the first collection section 51.

The collection section including the separated first collection section 51 disposed below the punching member 30 and second collection section 52 disposed below the second transport path 22 provides the capacities required at the respective positions, which saves the space for the collection section in the apparatus. The amount of punched scraps falling below the second transport path 22 is lower than that below the punching member 30, which enables the second collection section 52 to be smaller than the first collection section 51. It should be noted that such first collection section 51 and second collection section 52 instead of the collection section 50 may be used in the second embodiment and the embodiments described below.

4. Fourth Embodiment

Figure 8:
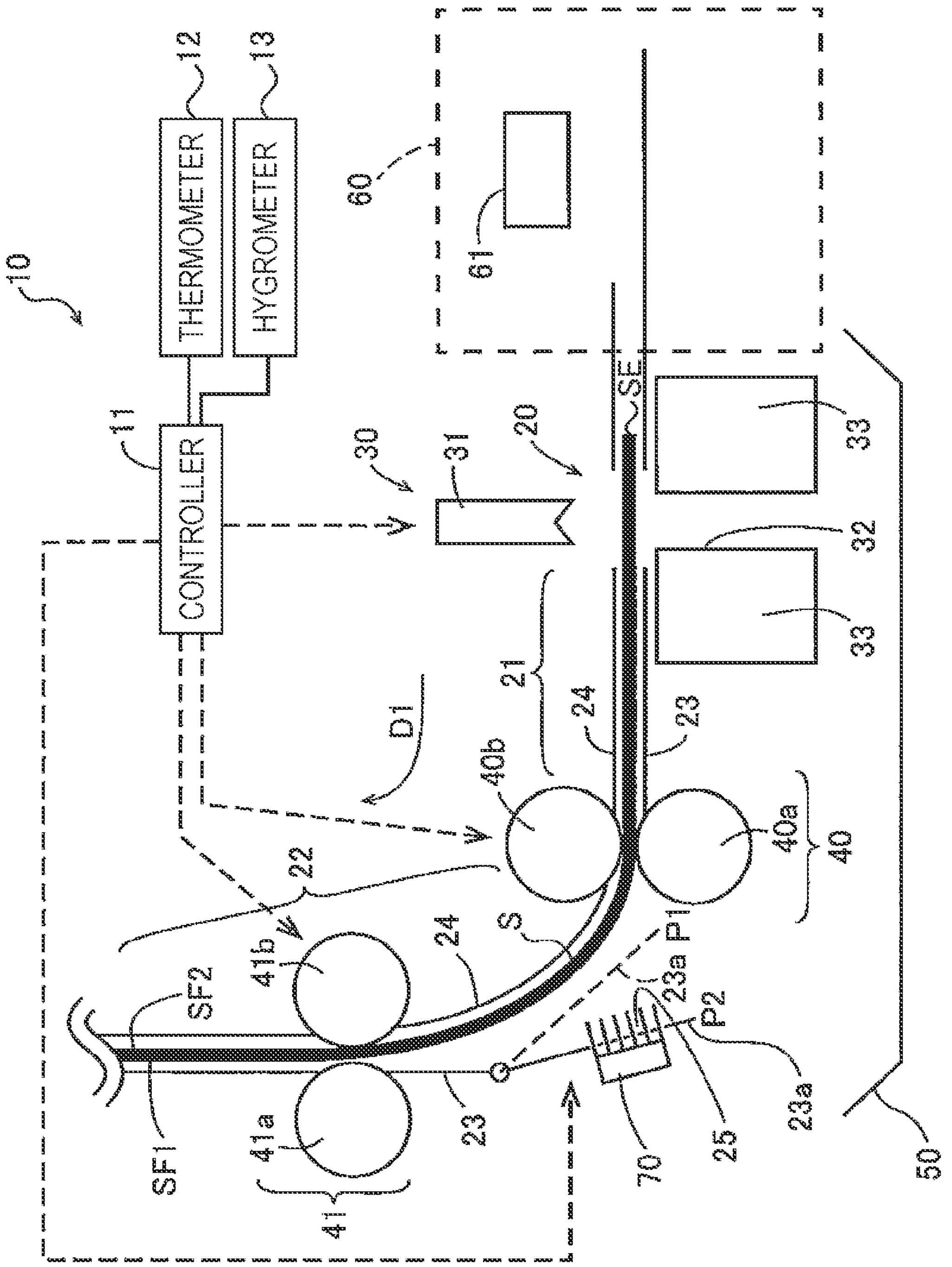
FIG. 8 is a schematic view illustrating a post-processing apparatus according to a fourth embodiment.

FIG. 8 is a schematic view illustrating a structure of the post-processing apparatus 10 according to a fourth embodiment viewed from the same side as in FIG. 1, FIG. 3, and FIG. 7. The post-processing apparatus 10 in FIG. 8 differs from that in FIG. 3 in that the post-processing apparatus 10 includes a brush 70 that can come into contact with the first surface SF1 of a medium S transported on the second transport path 22. In FIG. 8, the brush 70 is disposed at a position from which bristles of the brush 70 enter the second transport path 22 from the outside of the curved outer member 23*a*, with the curved outer member 23*a* being located at the second position P2. The curved outer member 23*a* has a window or a slit in an area 25 through which bristles of the brush 70 can enter. In FIG. 8, when the curved outer member 23*a* is located at the first position P1, the brush 70 is away from the inside of the second transport path 22.

With this structure, in the fourth embodiment, the brush 70 does not touch the medium S being transported on the second transport path 22 when the curved outer member 23*a* located at the first position P1. This structure reduces wear of the brush 70 because the brush 70 is not used when the curved outer member 23*a* is located at the first position P1. In contrast, the brush 70 touches the medium S being transported on the second transport path 22 when the curved outer member 23*a* is located at the second position P2. More specifically, when the trailing edge SE of the medium S is moved from the first transport path 21 to the second transport path 22, the trailing edge SE moves toward the curved outer member 23*a* and the first surface SF1 of the medium S touches the brush 70. With this structure, in addition to the above-described effect of removing punched scrap from the second transport path 22 when the curved outer member 23*a* is located at the second position P2, the effect of removing punched scraps using the brush 70 is provided.

5. Other Embodiments

When the first path member 23 (curved outer member 23*a*) of the second transport path 22 is located at the second position P2, the transport speed of the medium S may be faster than that when the curved outer member 23*a* is located at the first position P1.

More specifically, when the controller 11 performs the transport processing in step S120 after step S110 in the punching processing in FIG. 2, the controller 11 may change the transport speed depending on whether the curved outer member 23*a* is located at the first position P1 or the second position P2. When the curved outer member 23*a* is located at the first position P1, in step S120, the controller 11 causes the transport section to transport the medium S at a predetermined first speed, whereas when the curved outer member 23*a* is located at the second position P2, in step S120, the controller 11 causes the transport section to transport the medium S at a predetermined second speed that is faster than the first speed. This operation of increasing the transport speed when the curved outer member 23*a* is located at the second position P2 further increases the effect of removing punched scraps by the contact of the trailing edge SE of the medium S moved to the second transport path 22 with the curved outer member 23*a*.

When the first path member 23 (curved outer member 23*a*) in the second transport path 22 is located at the second position P2, the speed for transporting the medium S that has been punched by the punching member 30 may be faster than the speed for transporting the medium S that has not been punched by the punching member 30.

In FIG. 2, the speed for transporting the medium S that has not been punched is the transport speed in step S100, and the speed for transporting the medium S that has been punched is the transport speed in step S120. In step S100, the controller 11 causes the transport section to transport the medium S at a predetermined third speed. After step S110, when the curved outer member 23*a* is located at the first position P1, in step S120, the controller 11 causes the transport section to transport the medium S at the same speed as the third speed in step S100. In contrast, when the curved outer member 23*a* is located at the second position P2, in step S120, the controller 11 causes the transport section to transport the medium S at a predetermined fourth speed that is faster than the third speed. It may be considered that the first speed is the third speed and the second speed is the fourth speed. This operation of increasing the speed for transporting the medium S that has been punched when the curved outer member 23*a* is located at the second position P2 further increases the effect of removing punched scraps by the contact of the trailing edge SE of the medium S moved to the second transport path 22 with the curved outer member 23*a*.

The recording method used in the recording section 60 is not limited to the ink jet recording using the liquid discharge head 61, and any method such as electrophotographic recording, thermal recording, or the like may be used.

What is claimed is:

1. A post-processing apparatus comprising:

a transport path having a first path member that forms a path facing a first surface of a medium and a second path member that forms a path facing a second surface of the medium, the medium, on which recording was performed by a recording section, being transported on the transport path, and a punching member disposed on the transport path to perform punching on the medium, wherein the transport path includes

- a first transport path disposed downstream of the punching member in a transport direction, and
- a second transport path continuously extending downstream of the first transport path in the transport path, the second transport path having a curved shape to hold the medium in a curved state, the first path member in the second transport path forms an outer side of the curved shape and is disposed at a position further separated from the first surface than the first path member in the first transport path, and an upstream end in the transport direction of the medium in the curved state is moved from the first transport path to the second transport path.

2. The post-processing apparatus according to claim 1, further comprising:

a controller configured to control movement of the first path member in the second transport path, wherein the controller is configured to move the first path member in the second transport path to a first position or a second position further separated from the first surface than the first position, and to move the first path member in the second transport path to the first position or the second position by using information on recording performed by the recording section on the medium or information on an environment in which the post-processing apparatus is installed.

3. The post-processing apparatus according to claim 2, wherein when the recording section is configured to perform recording by discharging liquid and the controller controls the movement of the first path member in the second transport path by using the recording information, the controller compares a recording density, which is the recording information, at a position to be punched in the medium by the punching member and a density threshold of the recording density, and when the recording density at the position to be punched is greater than the density threshold, the controller causes the first path member in the second transport path to be moved to the second position.

4. The post-processing apparatus according to claim 3, wherein the controller changes the density threshold depending on humidity or temperature, which represents the environment information.

5. The post-processing apparatus according to claim 2, wherein when the controller controls the movement of the first path member in the second transport path by using the environment information, the controller compares humidity, which represents the environment information, with a first humidity threshold of humidity and when the humidity in the environment information is greater than or equal to the first humidity threshold, the controller causes the first path member in the second transport path to be moved to the second position.

6. The post-processing apparatus according to claim 2, wherein when the controller controls the movement of the first path member in the second transport path by using the environment information, the controller compares humidity and temperature, which represent the environment information, with a second humidity threshold of humidity and a temperature threshold of temperature, and when the humidity in the environment information is less than the second humidity threshold and the temperature in the environment information is less than the temperature threshold, the controller causes the first path member in the second transport path to be moved to the second position.

7. The post-processing apparatus according to claim 2, further comprising:

a brush configured to be in contact with the first surface of the medium transported on the second transport path in a state in which the first path member in the second transport path is located at the second position.

8. The post-processing apparatus according to claim 2, wherein when the first path member in the second transport path is located at the second position, a speed of transporting the medium is faster than a speed of transporting the medium when the first path member in the second transport path is located at the first position.

9. The post-processing apparatus according to claim 2, wherein when the first path member in the second transport path is located at the second position, a speed of transporting the medium that was punched by the punching member is faster than a speed of transporting the medium to be punched by the punching member.

10. The post-processing apparatus according to claim 1, wherein the punching member performs punching on an upstream end portion of the medium in the transport direction.

11. The post-processing apparatus according to claim 1, wherein the punching member performs punching in a direction from the second surface to the first surface of the medium.

12. The post-processing apparatus according to claim 1, further comprising:

a collection section configured to collect punched scraps from the medium created by the punching, wherein the collection section collects the punched scraps below the punching member and below the second transport path.

13. The post-processing apparatus according to claim 1, further comprising:

a collection section configured to collect punched scraps from the medium created by the punching, wherein the collection section includes a first collection section disposed below the punching member and a second collection section disposed below the second transport path, and a capacity of the second collection section is lower than a capacity of the first collection section.

14. The post-processing apparatus according to claim 1, wherein the second transport path curves upward with respect to a horizontal plane.

* * * * *